United States Patent
Wu et al.

(10) Patent No.: US 9,247,411 B2
(45) Date of Patent: Jan. 26, 2016

(54) METHODS AND APPARATUS FOR SUPPORTING MULTI-HOP PEER DISCOVERY IN PEER-TO-PEER WIRELESS NETWORKS

(75) Inventors: Xinzhou Wu, Monmouth Junction, NJ (US); Junyi Li, Chester, NJ (US); Aleksandar Jovicic, Jersey City, NJ (US); Sanjay Shakkottai, Austin, TX (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1022 days.

(21) Appl. No.: 12/645,746

(22) Filed: Dec. 23, 2009

(65) Prior Publication Data
US 2011/0149799 A1 Jun. 23, 2011

(51) Int. Cl.
H04B 7/14 (2006.01)
H04L 12/28 (2006.01)
H04W 8/00 (2009.01)
H04W 84/18 (2009.01)

(52) U.S. Cl.
CPC .............. *H04W 8/005* (2013.01); *H04W 84/18* (2013.01)

(58) Field of Classification Search
CPC ..... H04W 8/005; H04W 40/22; H04W 88/04; G06F 2221/0788
USPC .................. 370/254, 311, 315, 338
See application file for complete search history.

(56) References Cited

U.S. PATENT DOCUMENTS

| | | | |
|---|---|---|---|
| 6,990,080 B2 | 1/2006 | Bahl et al. | |
| 2002/0143855 A1* | 10/2002 | Traversat et al. | 709/202 |
| 2004/0125776 A1* | 7/2004 | Haugli et al. | 370/338 |
| 2005/0021725 A1* | 1/2005 | Lobbert | 709/223 |
| 2005/0117525 A1 | 6/2005 | Poustchi et al. | |
| 2006/0104301 A1 | 5/2006 | Beyer et al. | |
| 2007/0274232 A1 | 11/2007 | Axelsson et al. | |
| 2007/0286136 A1 | 12/2007 | Rittle et al. | |
| 2008/0002648 A1* | 1/2008 | Laroia et al. | 370/338 |

(Continued)

FOREIGN PATENT DOCUMENTS

| | | |
|---|---|---|
| EP | 2015502 | 1/2009 |
| JP | 2003249936 A | 9/2003 |
| JP | 2009112061 A | 5/2009 |

OTHER PUBLICATIONS

Teresa Vazao et al: "Information Networking: Towards Ubiquitous Networking and Services", ICOIN 2007, pp. 223-233, Jan. 2007.

(Continued)

*Primary Examiner* — Dang Ton
*Assistant Examiner* — Ryan Kavleski
(74) *Attorney, Agent, or Firm* — Eric Ho (57) ABSTRACT

Methods and apparatus for supporting multi-hop peer discovery in peer-to-peer wireless networks are disclosed. One method supports multi-hop peer discovery using a first peer having a first unique identification code. The method includes decoding a second peer discovery signal to obtain a second unique identification code and a second local identification code of a second peer received during a peer-to-peer discovery channel, determining whether to select the second peer based on a predetermined criterion; and transmitting a first peer discovery signal having the first unique identification code, the second local identification code and a hop count when the predetermined criterion is satisfied.

33 Claims, 9 Drawing Sheets

(56) References Cited

U.S. PATENT DOCUMENTS

| | | | |
|---|---|---|---|
| 2008/0037487 A1* | 2/2008 | Li et al. | 370/338 |
| 2009/0010190 A1* | 1/2009 | Gong | 370/311 |
| 2009/0016232 A1* | 1/2009 | Kwon et al. | 370/252 |
| 2009/0016353 A1* | 1/2009 | Li et al. | 370/395.3 |
| 2009/0016456 A1* | 1/2009 | Li et al. | 375/260 |
| 2009/0017844 A1* | 1/2009 | Li et al. | 455/458 |
| 2009/0019169 A1* | 1/2009 | Li et al. | 709/228 |
| 2009/0073924 A1 | 3/2009 | Chou | |
| 2009/0232024 A1* | 9/2009 | Hori et al. | 370/254 |
| 2009/0287827 A1 | 11/2009 | Horn et al. | |
| 2010/0022190 A1* | 1/2010 | Laroia et al. | 455/67.11 |
| 2012/0005304 A1* | 1/2012 | Guo et al. | 709/217 |

OTHER PUBLICATIONS

International Search Report and Written Opinion—PCT/US2010/061168—ISA/EPO—Apr. 6, 2011.
Taiwan Search Report—TW099145297—TIPO—Feb. 3, 2013.

* cited by examiner

First Peer Discovery Signal 600

FIG. 6

Second Peer Discovery Signal 700

FIG. 7

Third Peer Discovery Signal 800

FIG. 8

Fourth Peer Discovery Signal 900

First Peer Discovery Signal 1200

FIG. 12

Second Peer Discovery Signal 1300

FIG. 13

Third Peer Discovery Signal 1400

METHODS AND APPARATUS FOR SUPPORTING MULTI-HOP PEER DISCOVERY IN PEER-TO-PEER WIRELESS NETWORKS

BACKGROUND

1. Field

The invention relates to wireless communications. More particularly, the invention relates to methods and apparatus for supporting multi-hop peer discovery in peer-to-peer wireless networks.

2. Background

Wireless communications continues to grow in demand and has become an integral part of both personal and business communications. Wireless communications allow users to transmit and receive data from most anywhere using wireless networks and wireless devices such as laptops, cellular devices, iPhones®, BlackBerrys®, etc.

Wireless fidelity (WiFi) describes the wireless networks that adhere to the specifications developed by the Institute of Electrical and Electronic Engineers (IEEE) for wireless local area networks (LAN). WiFi devices are certified to be interoperable with other certified WiFi devices using the 802.11 standard of the IEEE. These WiFi devices allow over-the-air interfaces in order to create a wireless network for facilitating data transfer.

Generally, wireless networks are established through mobile devices communicating with one or more base stations, access points or access routers. A base station is a radio receiver/transmitter that serves as a hub for wireless networks. A base station typically includes a low-power transmitter and a wireless router. An access router may be configured as an access point that covers a geographic range or cell and, as the mobile device is operated, it may move in and out of these geographic cells.

Some wireless networks can be constructed utilizing solely peer-to-peer communications without utilizing base stations, access points, or access routers. Such wireless networks are sometimes referred to as WiFi networks. Communications in such networks may, in some cases, be limited to exchanges between mobile devices that are within direct wireless transmission range of each other, while in other cases multi-hop forwarding between non-adjacent mobile devices may be supported. Various techniques may be used to maintain connectivity and/or forward information as the topology of the wireless network changes (e.g., as mobile devices join the network, leave the network, or move within the network). Some networks can also be constructed utilizing a combination of peer-to-peer communications as well as communications with base stations, access points, or access routers.

As mobile devices move in and out of wireless networks, the potential for higher layer communications with other mobile devices may be determined based on a process of peer discovery. To enable peer discovery, information associated with a mobile device (e.g., identifier, how to establish communications, and so forth) is advertised or announced (e.g., broadcast) to other mobile devices within a range. In a wireless network, peer nodes or devices discover each other by periodically transmitting and detecting peer discovery signals, which carry unique node identifiers (IDs).

The range of operation of peer discovery can be extended by increasing the transmission power of the node's peer discovery signals. Increasing the transmission power however, results in several drawbacks such as a reduced battery life, a decrease in the spatial reuse of resource units (time and frequency) utilized for transmission of peer discovery signals, and an increase in the de-sense probability. As one would expect, an increase in the transmission power of peer discovery signals results in a reduction of the battery life of the node (e.g., mobile device). An n-fold increase in the distance between nodes requires an $n^2$-fold increase in the resource units. Also, an increase in the de-sense probability means that nodes wishing to discover far-away nodes get saturated by high-power peer discovery signals transmitted by near-by nodes.

Therefore, it has been recognized by those skilled in the art that a need exists for methods and apparatus for extending the range of operation of peer discovery without the aforementioned drawbacks.

SUMMARY

Methods and apparatus for supporting multi-hop peer discovery in peer-to-peer wireless networks are disclosed. One method supports multi-hop peer discovery using a first peer having a first unique identification code. The method includes decoding a second peer discovery signal to obtain a second unique identification code and a second local identification code of a second peer received during a peer-to-peer discovery channel, determining whether to select the second peer based on a predetermined criterion, and transmitting a first peer discovery signal having the first unique identification code, the second local identification code and a hop count when the predetermined criterion is satisfied.

Another method of supporting multi-hop peer discovery is disclosed. The method includes decoding a first peer discovery signal, the first peer discovery signal including a first unique identification code of a first peer received during a peer-to-peer discovery channel and a hop count, determining whether to transmit the first unique identification code based on a predetermined criterion, and transmitting a second peer discovery signal having the first unique identification code when the predetermined criterion is satisfied.

An apparatus for supporting multi-hop peer discovery using a first peer having a first unique identification code is disclosed. The apparatus includes a processor configured to decode a second peer discovery signal to obtain a second unique identification code and a second local identification code of a second peer received during a peer-to-peer discovery channel, determine whether to select the second peer based on a predetermined criterion, and transmit a first peer discovery signal having the first unique identification code, the second local identification code and a hop count when the predetermined criterion is satisfied.

Another apparatus for supporting multi-hop peer discovery is disclosed. The apparatus includes a processor configured to decode a first peer discovery signal, the first peer discovery signal including a first unique identification code of a first peer received during a peer-to-peer discovery channel and a hop count, determine whether to transmit the first unique identification code based on a predetermined criterion, and transmit a second peer discovery signal having the first unique identification code when the predetermined criterion is satisfied.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
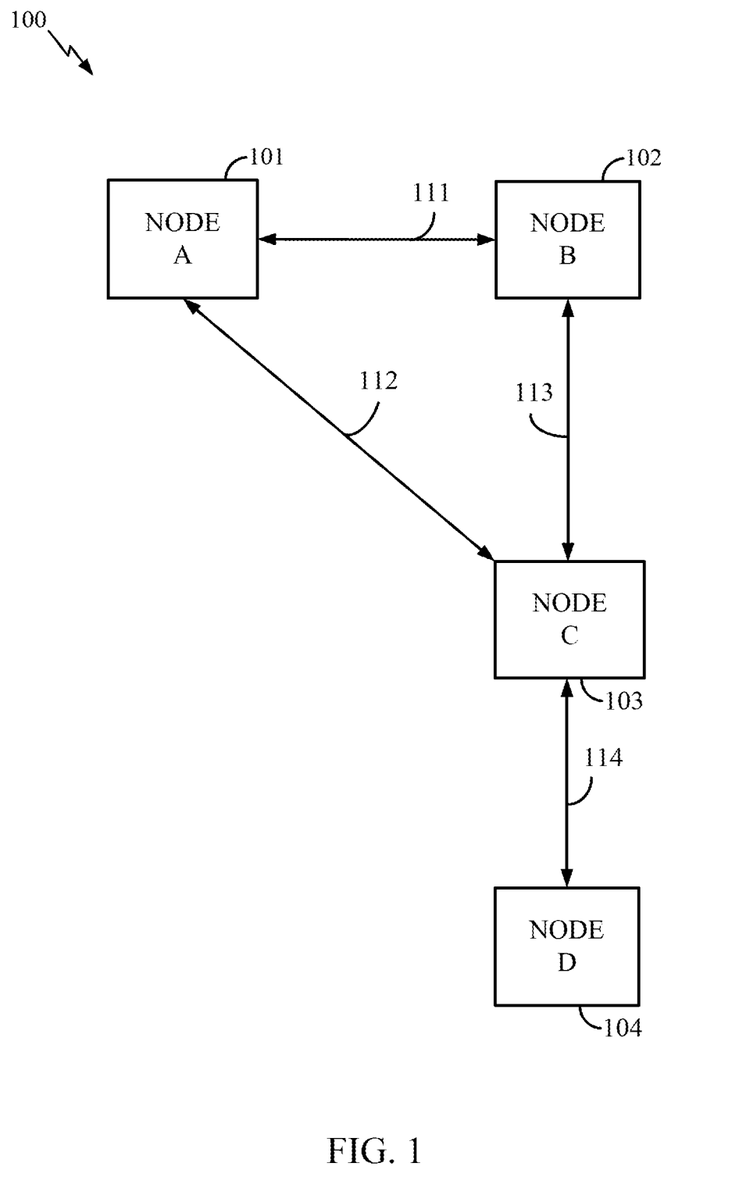
FIG. 1 is a simplified block diagram of a network having a plurality of nodes where each node can perform multi-hop peer discovery to extend the range of operation of peer discovery in accordance with various embodiments.

FIG. 1 is a simplified block diagram of a network 100 having a plurality of nodes 101, 102, 103 and 104 where each node can perform multi-hop peer discovery to extend the range of operation of peer discovery in accordance with various embodiments. The network 100 is configured to allow for an improved battery life for each node, an increase in the spatial reuse of resource units (time and frequency) utilized for transmission of peer discovery signals, and a decrease in the de-sense probability. In various embodiments, the network 100 can include one or more networks such as a WiFi network, an unlicensed network (i.e., a network operating in the unlicensed spectrum), a licensed network (i.e., a network operating in the licensed spectrum) and/or a carrier sense multiple access with collision avoidance (CSMA/CA) network, and each of the plurality of nodes 101, 102, 103 and 104 can be a WiFi device or node, a mobile device, a peer or a wireless communications device configured to operate in the licensed spectrum and/or the unlicensed spectrum, a user, or a white-space device (WSD) configured to operate in the licensed spectrum and/or the unlicensed spectrum. A WSD can be a mobile device, a laptop computer or other portable device operating in open or unused frequencies. For illustrative purposes, the disclosure will discuss WiFi networks; however, other types of licensed and unlicensed networks are within the scope of the invention. Furthermore, even though four nodes 101, 102, 103 and 104 are shown in FIG. 1, the network 100 can include one or more nodes. For illustrative purposes, nodes 101, 102, 103 and 104 will also be referred to as node A, node B, node C and node D, respectively.

Figure 2:
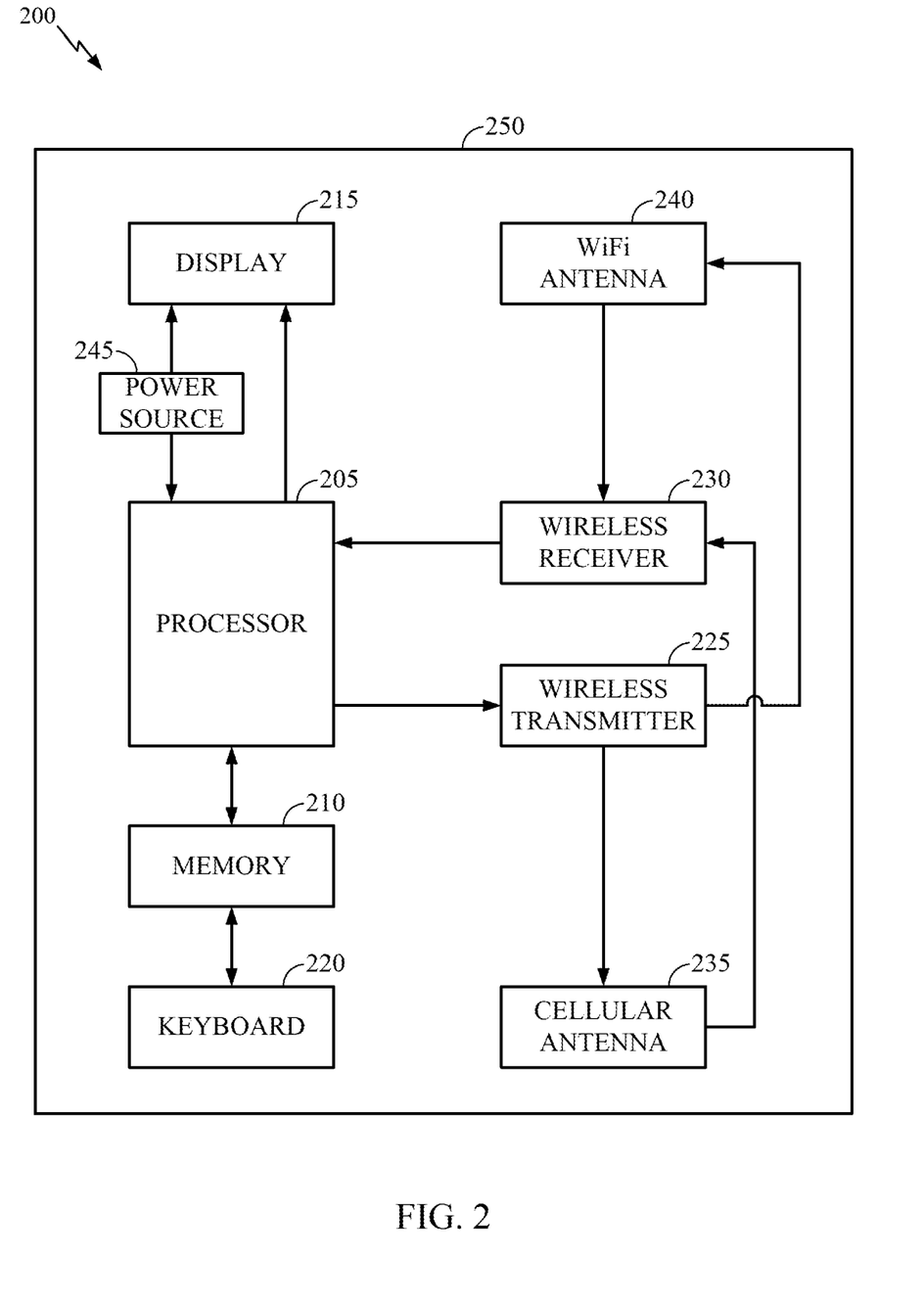
FIG. 2 is a block diagram of an exemplary node having a unique identifier (ID) and a local ID that represents the symbols and tones over which the node transmits its peer discovery signals in accordance with various embodiments.

FIG. 2 is a block diagram of an exemplary node having a unique identifier (ID) and a local ID that represents the symbols and tones over which the node transmits its peer discovery signals in accordance with various embodiments. In one embodiment, the unique ID has 128 bits and the local ID has 12 bits. The unique ID is the node's or peer's own identifier (e.g., phone number, name, etc.) that is unique to the node or peer. The unique ID can be assigned to the user operating the node or the node itself. No two nodes in the network have the same unique ID. The local ID is the resource units that the node uses to transmit the unique ID (see FIG. 3 for further details regarding the resource units). The unique ID is globally unique and the local ID is locally unique.

For illustrative purposes, the term "node" or "peer" will refer to a wireless communications device 200. The wireless communications device 200 is configured to communicate in the licensed spectrum and/or the unlicensed spectrum. The wireless communications device 200 includes a processor 205, a memory 210, a display 215, a keyboard 220, a wireless transmitter 225, a wireless receiver 230, a first antenna 235, a second antenna 240, and a power source 245 (e.g., a battery). The chips, components or modules may be attached or formed on a printed circuit board 250. The printed circuit board 250 can refer to any dielectric substrate, ceramic substrate, or other circuit carrying structure for carrying signal circuits and electronic components within the wireless communications device 200.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure. The display 215 may be a LCD, LED or plasma display screen and the keyboard 220 may be a standard keyboard (e.g., a QWERTY layout) having letters and numbers.

The wireless transmitter 225 is coupled to the processor 205 and is used to encode and format the data for transmission via the first antenna 235 and/or the second antenna 240. The wireless transmitter 225 includes chips, circuitry and/or software that are used to transmit data and/or signals that are received from the processor 205 and prior to being sent to the first antenna 235 and/or the second antenna 240 for transmission over a channel. The wireless transmitter 225 may use information (e.g., an ID) received from other channels or nodes via the first antenna 235, the second antenna 240, and/or the processor 205 to create new data and/or signals for transmission to other nodes.

The wireless receiver 230 is coupled to the processor 205 and is used to decode and parse the data after being received from the first antenna 235 and/or the second antenna 240. The wireless receiver 230 includes chips, circuitry and/or software that are used to receive information (e.g., an ID) from other channels or nodes via the first antenna 235 and/or the second antenna 240. The information is sent to the processor 205 for decoding and processing of the data and/or signals that are to be transmitted to another node via the first antenna 235 and/or the second antenna 240.

The first antenna 235 may be positioned at a lower right portion of the wireless communications device 200 and the second antenna 240 may be positioned at an upper right portion of the wireless communications device 200. The first antenna 235 may be a cellular antenna, a GSM antenna, a CDMA antenna, a WCDMA antenna, a 3G antenna, a 4G antenna, or any other antenna capable of operating using the licensed spectrum. The second antenna 240 may be a WiFi antenna, a GPS antenna, or any other antenna capable of operating using the unlicensed spectrum. The power source 245 supplies power to the components or modules shown in FIG. 2. For illustrative purposes, each node A, B, C and D shown in FIG. 1 can be a wireless communications device 200 as shown in FIG. 2.

Figure 3:
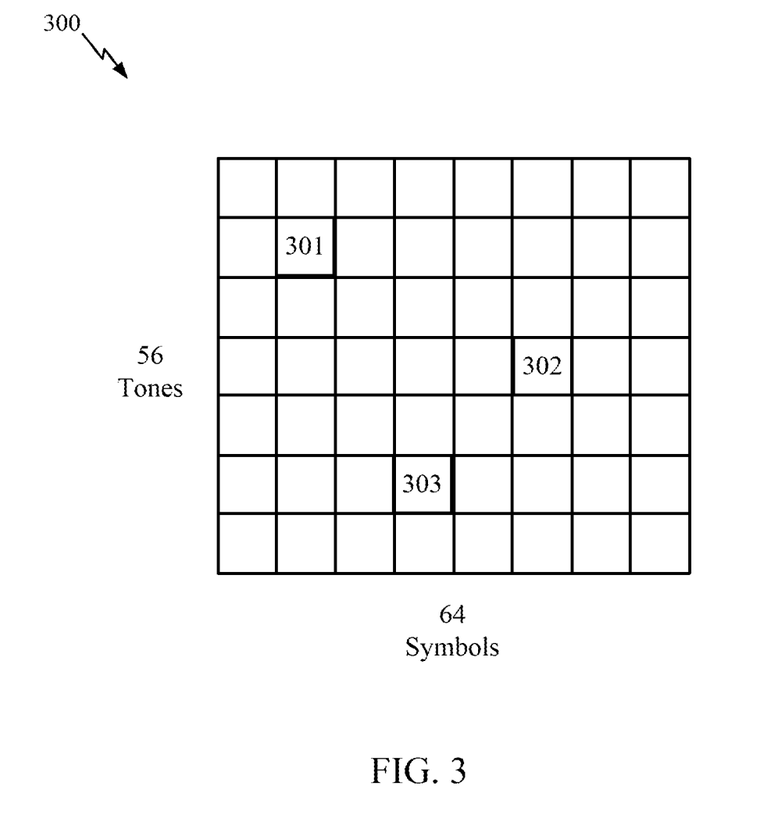
FIG. 3 is a table of resource units for the local ID in accordance with various embodiments.

FIG. 3 is a table 300 of resource units for the local ID in accordance with various embodiments. Typically table 300 includes 56,000 resource units for long range peer discovery. Each node may store the information contained in the table 300 in its memory 210. Each resource unit includes a pair of indicies, one being time (i.e., symbol) and one being frequency (i.e., tone). That is, one or more symbols and one or more tones are grouped together in a logical structure called a resource unit. Each node retrieves a resource unit from the table 300 as its local ID to transmit its unique ID. Hence, 56,000 resource units exist for the node to transmit its unique ID on. The local ID is a short-hand way of identifying the node. The local ID is unique to the neighborhood (i.e., surrounding nodes) but not unique to the network. The local ID may be determined by the position of the time/frequency grid (i.e., the resource unit).

Each node that desires to participate in peer discovery retrieves a resource unit from its memory 210. For illustrative purpose, the resource units are identified as 301, 302, 303, and so on. Each resource unit retrieved by a node can be referred to as the node's local ID. Multiple nodes can retrieve the same resource unit; therefore, the node's local ID is generally not unique to one particular node.

Figure 4:
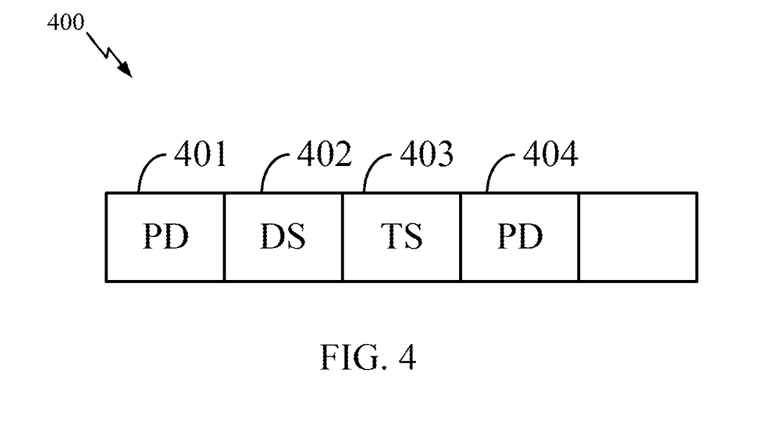
FIG. 4 is an exemplary peer discovery slot in accordance with various embodiments.

FIG. 4 is an exemplary peer discovery slot 400 in accordance with various embodiments. The peer discovery slot 400 may include peer discovery (PD) 401, discovery service (DS) 402, time synchronization (TS) 403, and then peer discovery (PD) 404 again. During the peer discovery slot 400, each node listens and transmits so each node knows which local ID it is suppose to occupy and knows where to transmit. Therefore, for all other symbols, the node can receive and decode other nodes' peer discovery information.

As an example, node A advertises its presence by broadcasting peer discovery information throughout the wireless network 100. Node A would like to maximize the range over which peer discovery information (e.g., signals) can be decoded. One way to maximize the range is to greatly increase the transmit power of the peer discovery signals. The first drawback of greatly increasing the transmit power is that it is very power inefficient (i.e., reduced battery life) for the node transmitting the peer discovery signals. The second drawback is the scaling of the reuse of the channel is significantly reduced (i.e., the spatial reuse of the local IDs is very limited). The third drawback is that other nodes who are listening on the symbol may only be able to hear the node with the increased transmit power and nobody else. This results in an increase in the de-sense probability.

Figure 5:
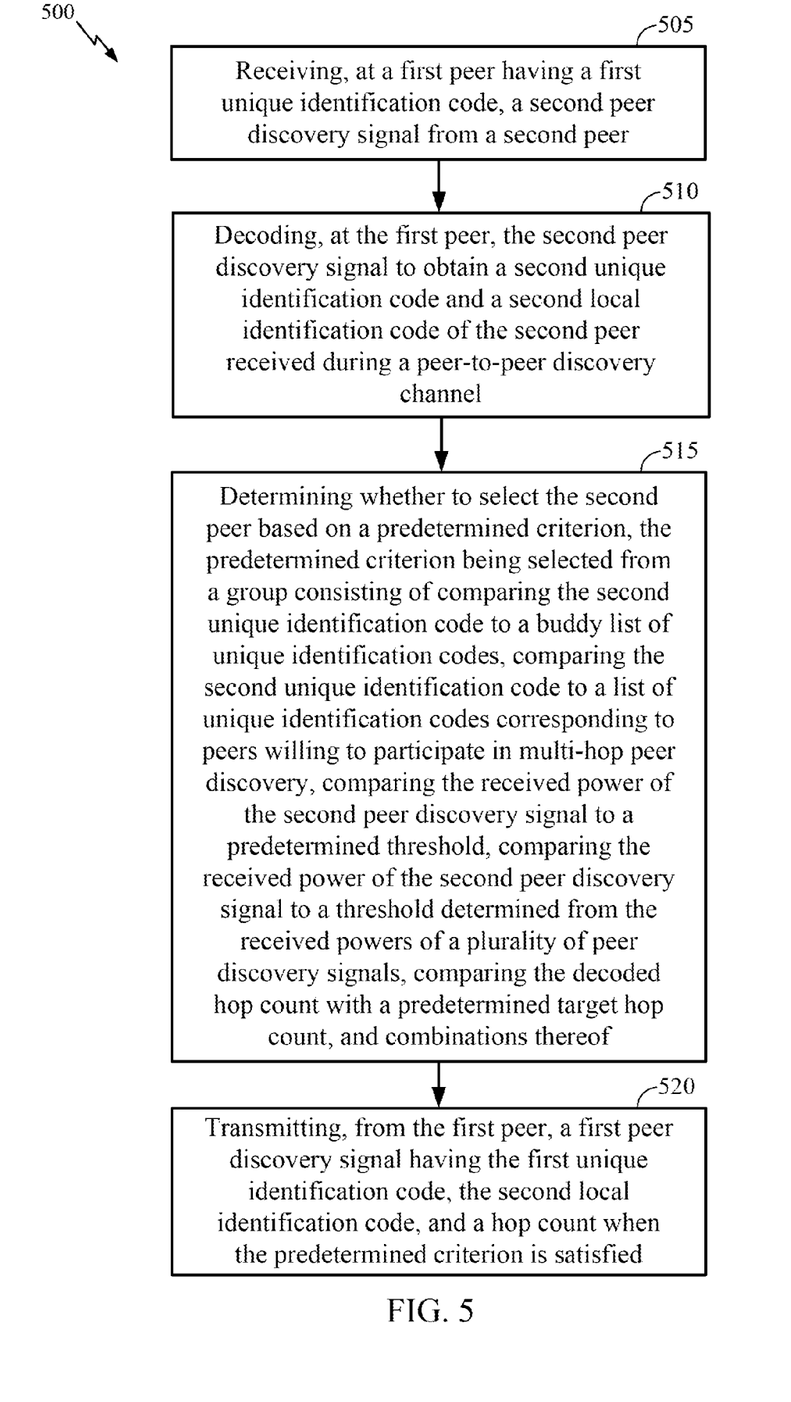
FIG. 5 is a flow diagram illustrating a method of supporting multi-hop peer discovery in a network in accordance with various embodiments.
Figure 6:
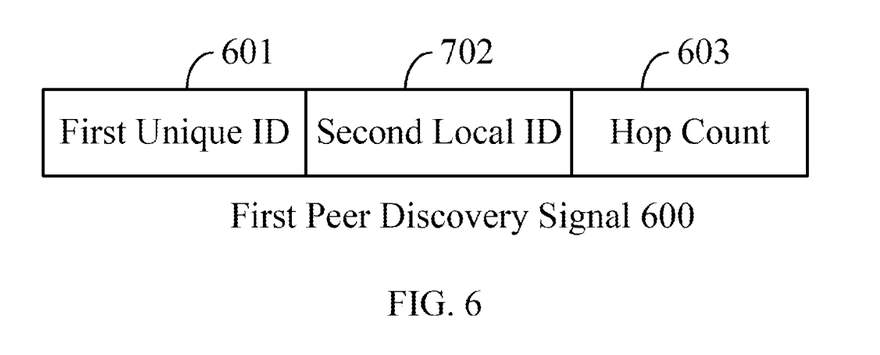
FIG. 6 is an exemplary first peer discovery signal in accordance with various embodiments.
Figure 7:
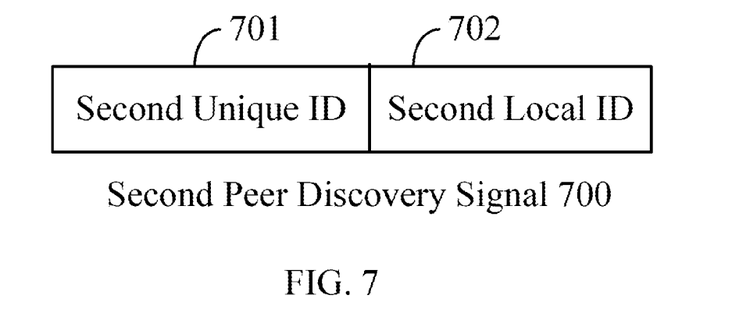
FIG. 7 is an exemplary second peer discovery signal in accordance with various embodiments.
Figure 8:
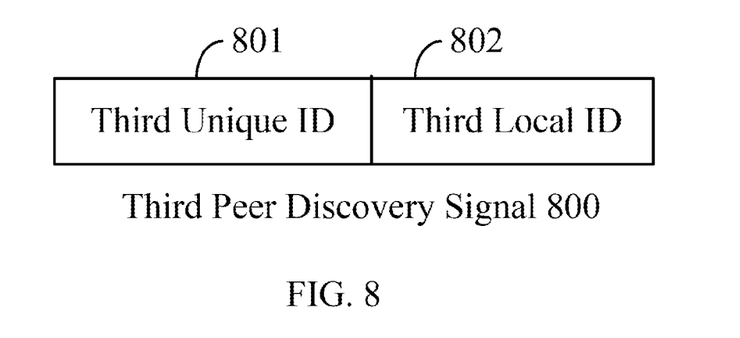
FIG. 8 is an exemplary third peer discovery signal in accordance with various embodiments.

FIG. 5 is a flow diagram illustrating a method 500 of supporting multi-hop peer discovery in the network 100 in accordance with various embodiments. FIGS. 6, 7 and 8 are exemplary first, second and third peer discovery signals 600, 700 and 800, respectively, in accordance with various embodiments. Referring to FIGS. 1-8, node A (e.g., a first peer) has a first unique identification code stored in its memory 210 (block 505). Each node has its own unique identification code stored in its memory 210. Node A would like to participate in long range peer discovery. During the peer discovery slot 400, node A broadcasts or transmits initial peer discovery signals via a plurality of channels 111 and 112 to a plurality of nodes (e.g., a second peer node B and a third peer node C). Node A may broadcast or transmit the initial peer discovery signals using its wireless transmitter 225 and its second antenna 240.

During the peer discovery slot 400, nodes B and C receive and decode the initial peer discovery signals transmitted from node A. Once the initial peer discovery signals are received from node A, node B (e.g., a second peer) acknowledges that node A would like to participate in long range peer discovery and creates a second peer discovery signal 700, which includes a second unique identification code 701 and a second local identification code 702. Node B retrieves the second unique identification code 701 and the second local identification code 702 from its memory 210. Node C (e.g., a third peer) may create a third peer discovery signal 800 in a similar manner as described above for node B.

Node B may transmit the second peer discovery signal to node A using channel 111 and node C may transmit the third peer discovery signal to node A using channel 112. Node B (and/or node C) may receive the initial peer discovery signals using its wireless receiver 230 and its second antenna 240, may decode the initial peer discovery signals using its processor 205, and may transmit the second or third peer discovery signal to node A using its wireless transmitter 225 and its second antenna 240. Node B may transmit the second peer discovery signal 700 to node A using one or more peer discovery slots 400. Generally, several peer discovery slots 400 are used to transmit the second peer discovery signal 700.

Node A receives and decodes the second peer discovery signal 700 from node B (blocks 505 and 510). Node A may have to decode several peer discovery slots 400 to obtain the second unique identification code 701 and the second local identification code 702 of node B. Also, node A receives and decodes the third peer discovery signal 800 from node C. Node A may have to decode several peer discovery slots 400 to obtain the third unique identification code 801 and the third local identification code 801 of node C.

Node A may select node B (or node C) to relay its first unique identification code for long range peer discovery (block 515). Node A may select one or more of the plurality of nodes (e.g., node B and/or node C) based on a predetermined criterion. The predetermined criterion may be one or more of the following: (1) comparing the second unique identification code to a buddy list of unique identification codes, (2) comparing the second unique identification code to a list of unique identification codes corresponding to peers willing to participate in multi-hop peer discovery, (3) comparing the received power of the second peer discovery signal to a predetermined threshold, (4) comparing the received power of the second peer discovery signal to a threshold determined from the received powers of a plurality of peer discovery signals, (5) comparing the decoded hop count with a predetermined target hop count, and combinations thereof. Node A makes the selection by choosing or retrieving the local identification code of the node (i.e., local ID of target node). The following examples illustrate how node A selects one or more of the plurality of nodes that satisfy the predetermined criterion.

In a first example, node A may store a buddy list of unique identification codes in its memory 210. The buddy list may include a list of unique identification codes corresponding to node A's friends, relatives, classmates, etc. Node A compares the second unique identification code of node B to the buddy list and if the second unique identification code is on the buddy list (i.e., the predetermined criterion is satisfied), node B is a friend, relative, classmate, etc. and node A can then select node B.

In a second example, all nodes or peers (e.g., nodes B and C) willing to participate in multi-hop peer discovery (i.e., relaying) may publish their unique identification codes on a website. Node A may retrieve this list of unique identification codes from the website and store the list in its memory 210. The list of unique identification codes may be limited to a group of devices in the neighborhood or vicinity of node A. Node A compares the second unique identification code of node B to the list of unique identification codes and if the second unique identification code is on the list (i.e., the predetermined criterion is satisfied), node B is willing to participate and node A can then select node B.

In a third example, node A has already received the second peer discovery signal 700 from node B. Using its processor 205 and/or wireless receiver 230, node A determines the received power of the second peer discovery signal 700 and compares the received power of the second peer discovery signal 700 to a predetermined threshold. If the received power of the second peer discovery signal 700 is greater than or equal to the predetermined threshold, node B is close enough to participate as a relay node and the predetermined criterion is satisfied. If the received power of the second peer discovery signal 700 is less than the predetermined threshold, node B is too far to participate as a relay node and the predetermined criterion is not satisfied. The predetermined threshold may be set at a received power level that is high enough to accurately receive signals from node A.

In a fourth example, node A has already received the second peer discovery signal 700 from node B. Using its processor 205 and/or wireless receiver 230, node A determines the received power of the second peer discovery signal 700 and compares the received power of the second peer discovery signal 700 to a threshold determined from the received powers of a plurality of peer discovery signals (e.g., signals from nodes B, C and D). For example, the threshold may be set to an average or a median of the received powers. Therefore, the nodes with a received power greater than or equal to the threshold have signals that are strong enough to participate as a relay node and the predetermined criterion is satisfied. However, the nodes with a received power less than the threshold have signals that are not strong enough to participate as a relay node and the predetermined criterion is not satisfied.

In a fifth example, node A compares the decoded hop count with a predetermined target hop count. If the decoded hop count is equal to the predetermined target hop count, then the maximum hops have been reached and the predetermined criterion is not satisfied. If the decoded hop count is not equal to the predetermined target hop count, then node A can transmit the first unique identification code 601 and the predetermined criterion is satisfied.

When the predetermined criterion is satisfied, node A creates the first peer discovery signal 600 by appending or combining its unique identification code 601 and the local identification code of the selected node (e.g., the second local identification code 702 of node B). In addition, the first peer discovery signal 600 can include a hop count 603 indicting the number of times the first unique identification code 601 can be relayed. The hop count 603 can be set by the wireless network. In this example, the first peer discovery signal 600 includes the first unique identification code 601, the second local identification code 702 and the hop count 603. Since the predetermined criterion is satisfied, node A encodes the first peer discovery signal 600 and transmits the encoded first peer discovery signal 600 to node B (block 520).

Figure 9:
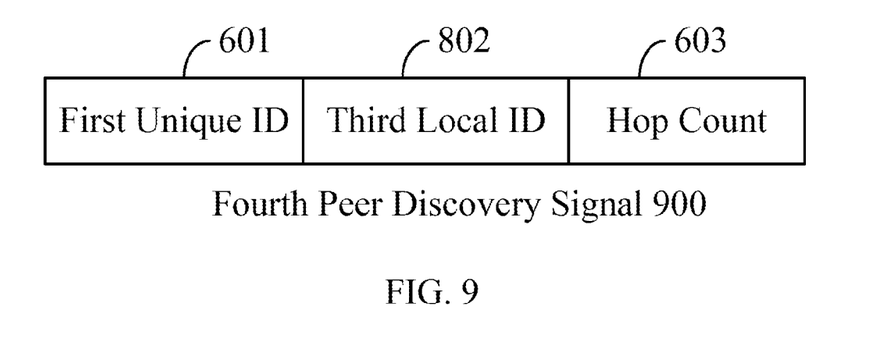
FIG. 9 is an exemplary fourth peer discovery signal in accordance with various embodiments.

Node B realizes that it has been selected for long range peer discovery because it receives the encoded first peer discovery signal 600. Node B decodes the first peer discovery signal 600, decreases the hop count 603 by 1, and proceeds to create a fourth peer discovery signal 900 if the hop count 603 has not reached 0. If the hop count 603 has reached 0, the last node or peer (e.g., node B) has been reached and no further relaying of the first unique identification code 601 is permitted. If the hop count 603 has not reached 0, node B needs to relay the first unique identification code 601 of node A and the local identification code of the next target node. Hence, node B selects the next peer in a similar manner as discussed above for node A.

Node B receives and decodes the third peer discovery signal 800 from node C. Node B may have to decode several peer discovery slots 400 to obtain the third unique identification code 801 and the third local identification code 802 of node C.

Node B may select node C to relay the first unique identification code 601 for long range peer discovery. Node B may select one or more of the plurality of nodes (e.g., node C and/or node D) based on the predetermined criterion (discussed above).

When the predetermined criterion is satisfied, node B creates the fourth peer discovery signal 900 by appending or combining the first unique identification code 601 and the local identification code of the selected node (e.g., the third local identification code 802 of node C). In addition, the fourth peer discovery signal 900 can include the hop count 603. In this example, the fourth peer discovery signal 900 includes the first unique identification code 601, the third local identification code 802 and the hop count 603. Since the predetermined criterion is satisfied, node B encodes the fourth peer discovery signal 900 and transmits the encoded fourth peer discovery signal 900 to node C.

Node C realizes that it has been selected for long range peer discovery because it receives the encoded fourth peer discovery signal 900. Node C decodes the fourth peer discovery signal 900, decreases the hop count 603 by 1, and proceeds to create a peer discovery signal if the hop count 603 has not reached 0. If the hop count 603 has reached 0, the last node or peer (e.g., node C) has been reached and no further relaying of the first unique identification code 601 is permitted. If the hop count 603 has not reached 0, node C needs to relay the first unique identification code 601 of node A and the local identification code of the next target node. Hence, node C selects the next peer in a similar manner as discussed above for node A.

Figure 10:
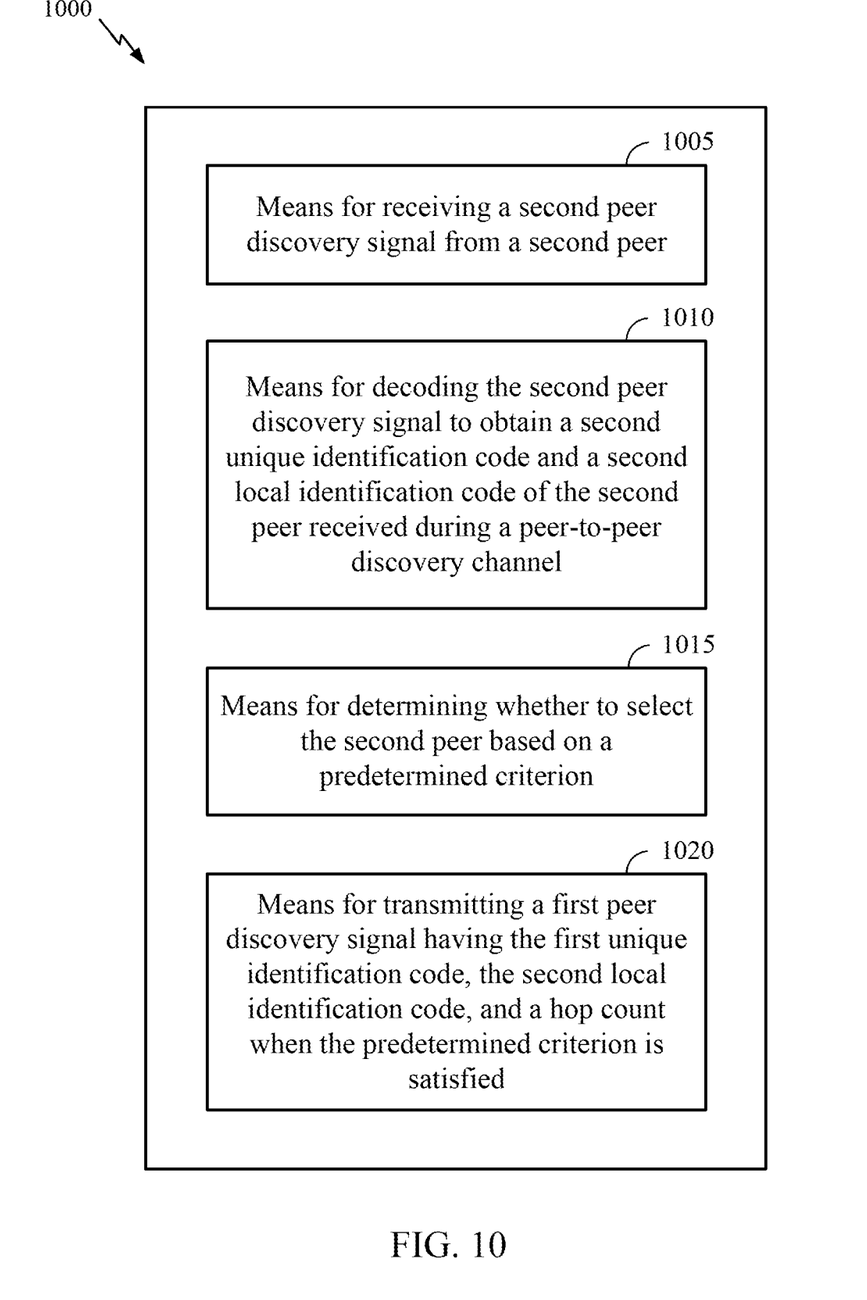
FIG. 10 is a block diagram illustrating exemplary components for the apparatus and the means for apparatus for supporting multi-hop peer discovery in a network in accordance with various embodiments.

FIG. 10 is a block diagram illustrating exemplary components for the apparatus 1000 and the means for apparatus 1000 for supporting multi-hop peer discovery in a network in accordance with various embodiments. The apparatus 1000 may include a module 1005 for receiving a second peer discovery signal 111 from a second peer 102, a module 1010 for decoding the second peer discovery signal 111 to obtain a second unique identification code 701 and a second local identification code 702 of the second peer 102 received during a peer-to-peer discovery channel, a module 1015 for determining whether to select the second peer 102 based on a predetermined criterion, and a module 1020 for transmitting a first peer discovery signal 600 having the first unique identification code 601, the second local identification code 702, and a hop count 603 when the predetermined criterion is satisfied.

Figure 11:
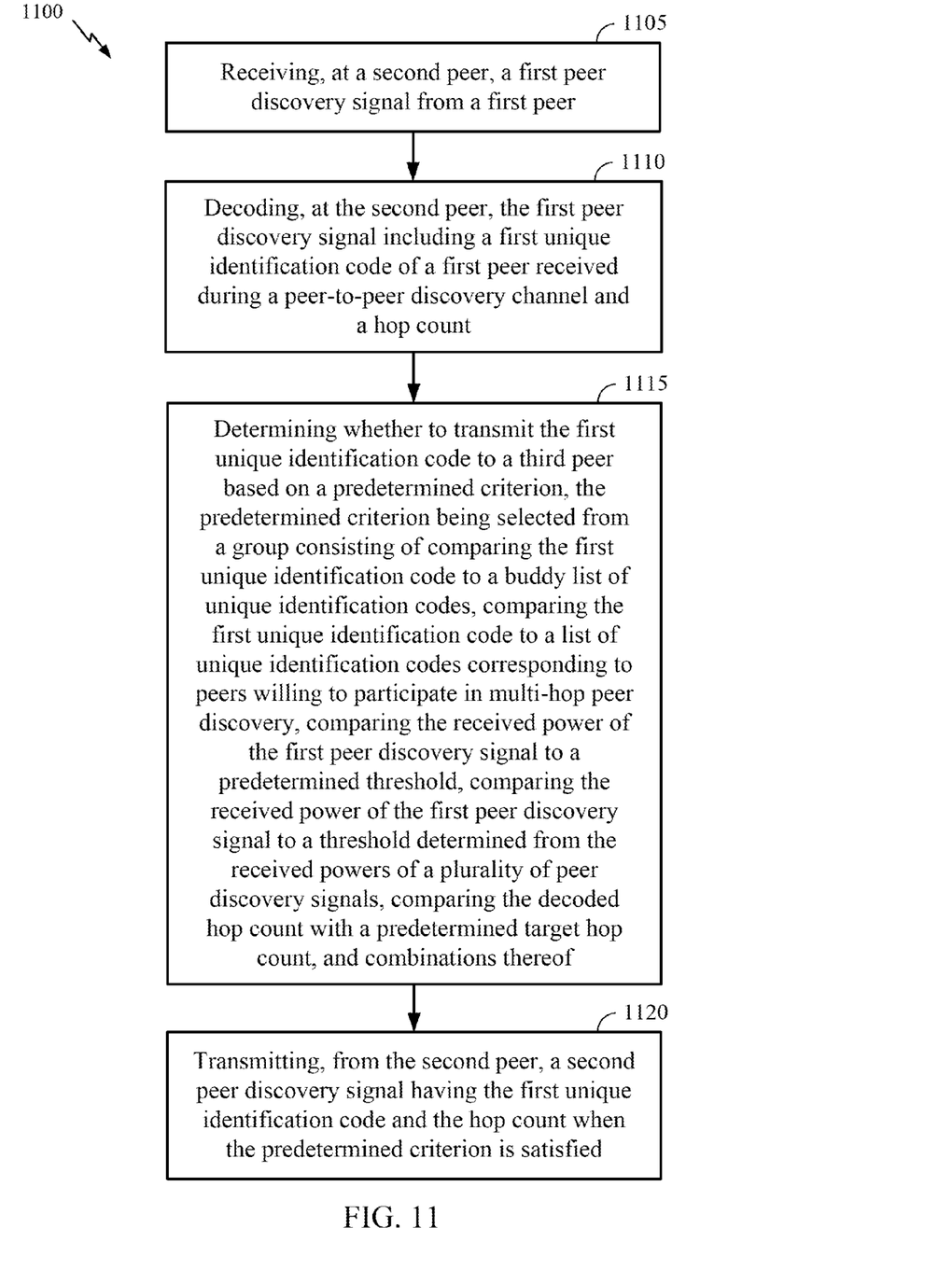
FIG. 11 is a flow diagram illustrating a method of supporting multi-hop peer discovery in a network in accordance with various embodiments.
Figure 12:
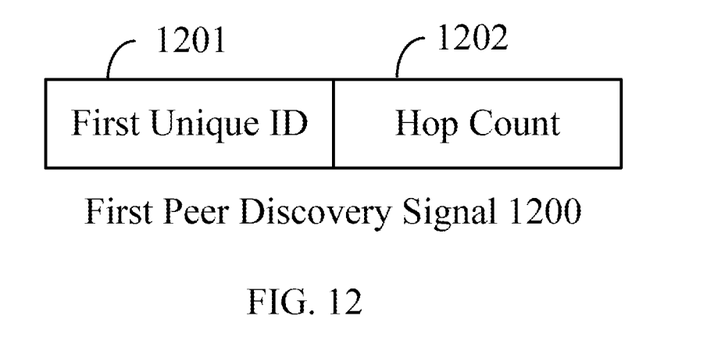
FIG. 12 is an exemplary first peer discovery signal in accordance with various embodiments.
Figure 13:
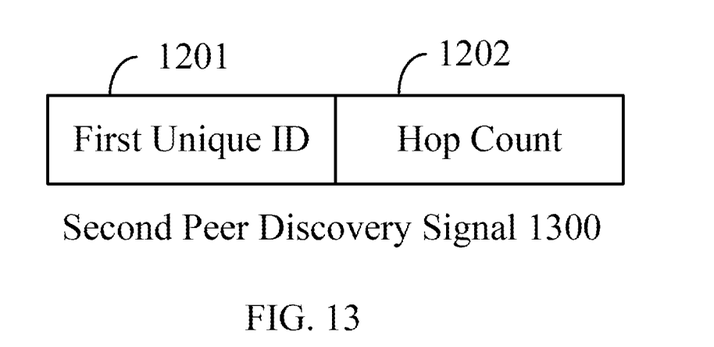
FIG. 13 is an exemplary second peer discovery signal in accordance with various embodiments.
Figure 14:
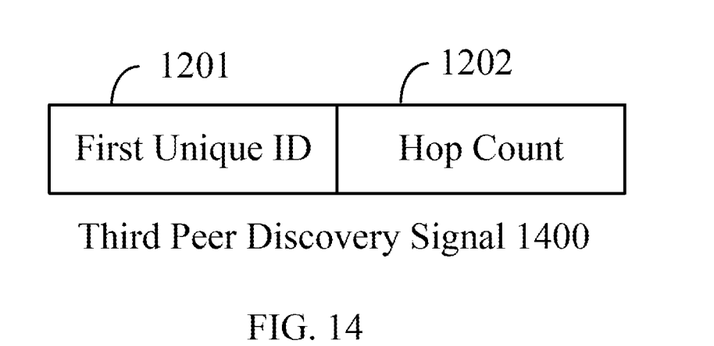
FIG. 14 is an exemplary third peer discovery signal in accordance with various embodiments.

FIG. 11 is a flow diagram illustrating a method 1100 of supporting multi-hop peer discovery in the network 100 in accordance with various embodiments. FIGS. 12, 13 and 14 are exemplary first, second and third peer discovery signals 1200, 1300 and 1400, respectively, in accordance with various embodiments. Referring to FIGS. 1-4 and FIGS. 11-14, node A (e.g., a first peer) has a first unique identification code 1201 stored in its memory 210. Node A would like to participate in long range peer discovery. Node A creates a first peer discovery signal 1200 including its first unique identification code 1201 and a hop count 1202. During the peer discovery slot 400, node A broadcasts or transmits the first peer discovery signal 1200 via channels 111 and 112 to a plurality of nodes (e.g., a second node B and a third node C). Node A may broadcast or transmit the first peer discovery signal 1200 using its wireless transmitter 225 and its second antenna 240.

During the peer discovery slot 400, nodes B and C receive the first peer discovery signals 1200 transmitted from node A (block 1105). Once the first peer discovery signals 1200 are received at nodes B and C, node B (e.g., a second peer) decodes the first peer discovery signal 1200 to obtain node A's unique identification code 1201 and the hop count 1202 (block 1110). Node B decreases the hop count by 1. Node B may receive the first peer discovery signal 1200 using its wireless receiver 230 and its second antenna 240 and may decode the first peer discovery signal 1200 using its processor 205.

Node B determines, using its processor 205, whether to forward or transmit node A's unique identification code 1201 to a third peer (e.g., node C) based on the one or more predetermined criterion (block 1115). The predetermined criterion may be one or more of the following: (1) comparing the first unique identification code to a buddy list of unique identification codes, (2) comparing the first unique identification code to a list of unique identification codes corresponding to peers willing to participate in multi-hop peer discovery, (3) comparing the received power of the first peer discovery signal to a predetermined threshold, (4) comparing the received power of the first peer discovery signal to a threshold determined from the received powers of a plurality of peer discovery signals, (5) comparing the decoded hop count with a predetermined target hop count, and combinations thereof.

As an example, node B may determine that node A's unique identification code 1201 is on node B's buddy list and then node B will want to forward or transmit node A's unique identification code 1201 to another peer (e.g., node C) using channel 113. Node B transmits the second peer discovery signal 1300 including the first unique identification code 1201 and the hop count 1202 when the predetermined criterion has been satisfied (block 1120). Node B may transmit the second peer discovery signal 1300 to node C using one or more peer discovery slots 400. Generally, several peer discovery slots 400 are used to transmit the second peer discovery signal 1300. Node B may transmit the second peer discovery signal 1300 to node C using its wireless transmitter 225 and its second antenna 240.

During the peer discovery slot 400, node C receives the second peer discovery signals 1300 transmitted from node B. Once the second peer discovery signal 1300 is received at node C, node C (e.g., a third peer) decodes the second peer discovery signal 1300 to obtain node A's unique identification code 1201 and the hop count 1202. Node C decreases the hop count by 1. Node C may receive the second peer discovery signal 1300 using its wireless receiver 230 and its second antenna 240 and may decode the second peer discovery signal 1300 using its processor 205.

Node C determines, using its processor 205, whether to forward or transmit node A's unique identification code 1201 to a fourth peer (e.g., node D) based on the one or more predetermined criterion. As an example, node C may determine that node A's unique identification code 1201 is on node C's buddy list and then node C will want to forward or transmit node A's unique identification code 1201 to another peer (e.g., node D) using channel 114. Node C transmits the third peer discovery signal 1400 including the first unique identification code 1201 and the hop count 1202 when the predetermined criterion has been satisfied. Node C may transmit the third peer discovery signal 1400 to node D using one or more peer discovery slots 400. Generally, several peer discovery slots 400 are used to transmit the third peer discovery signal 1400. Node C may transmit the third peer discovery signal 1400 to node D using its wireless transmitter 225 and its second antenna 240.

Figure 15:
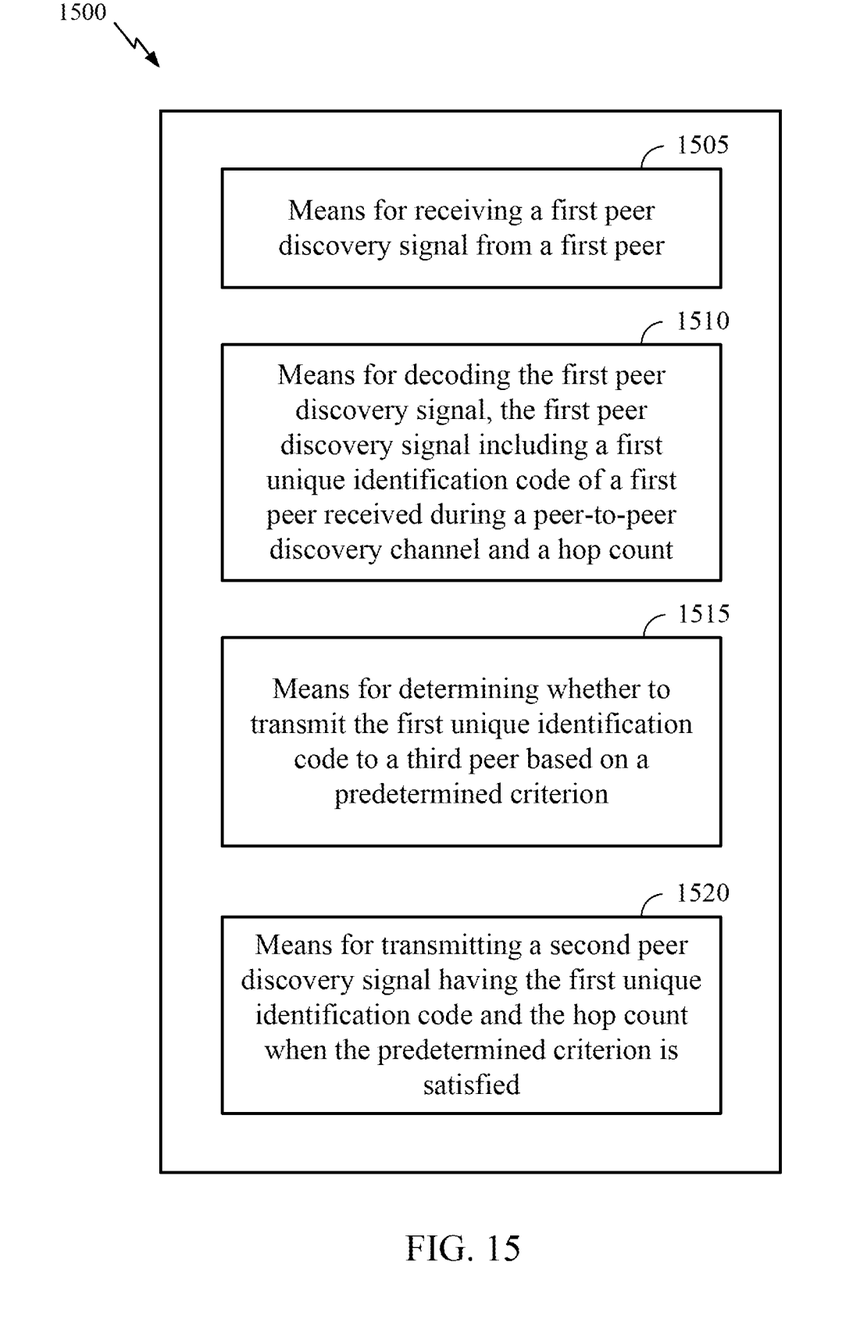
FIG. 15 is a block diagram illustrating exemplary components for the apparatus and the means for apparatus for supporting multi-hop peer discovery in a network in accordance with various embodiments.

FIG. 15 is a block diagram illustrating exemplary components for the apparatus 1500 and the means for apparatus 1500 for supporting multi-hop peer discovery in a network in accordance with various embodiments. The apparatus 1500 may include a module 1505 for receiving a first peer discovery signal 1200 from a first peer 101, a module 1510 for decoding the first peer discovery signal 1200 including a first unique identification code 1201 of the first peer 101 received during a peer-to-peer discovery channel and a hop count 1202, a module 1515 for determining whether to transmit the first unique identification code 1201 to a third peer 103 based on a predetermined criterion, and a module 1520 for transmitting a second peer discovery signal 1300 having the first unique identification code 1201 and the hop count 1202 when the predetermined criterion is satisfied.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of supporting multi-hop peer discovery using a first peer having a first unique identification code, the method comprising:
    decoding a second peer discovery signal to obtain a second unique identification code and a second local identification code of a second peer received during a peer-to-peer discovery channel, wherein the second local identification code is locally unique to the second peer and is associated with at least one tone-symbol used to transmit the second unique identification code;
    determining whether to select the second peer based on a predetermined criterion; and
    transmitting a first peer discovery signal from the first peer, the first peer discovery signal including information indicating the first unique identification code of the first peer, the second local identification code of the second peer, and a hop count when the predetermined criterion is satisfied.

2. The method of claim 1, wherein the predetermined criterion is selected from a group consisting of comparing the second unique identification code to a buddy list of unique identification codes, comparing the second unique identification code to a list of unique identification codes corresponding to peers willing to participate in multi-hop peer discovery, comparing the received power of the second peer discovery signal to a predetermined threshold, comparing the received power of the second peer discovery signal to a threshold determined from the received powers of a plurality of peer discovery signals, and combinations thereof.

3. The method of claim 1, further comprising encoding the first peer discovery signal.

4. The method of claim 3, further comprising decoding, at the second peer, the first peer discovery signal including the first unique identification code, the second local identification code and the hop count.

5. The method of claim 4, further comprising determining whether the decoded bits corresponding to the second local identification code contained in the first peer discovery signal match the second local identification code and whether the decoded bits corresponding to the hop count match a predetermined target hop count.

6. The method of claim 5, further comprising:
    decoding a third unique identification code and a third local identification code of a third peer received during a peer-to-peer discovery channel; and
    determining whether to select the third peer based on another predetermined criterion if the decoded bits corresponding to the second local identification code contained in the first peer discovery signal match the second local identification code and the decoded bits corresponding to the hop count do not match the predetermined target hop count.

7. The method of claim 6, wherein the other predetermined criterion is selected from a group consisting of comparing the third unique identification code to a buddy list of unique identification codes, comparing the third unique identification code to a list of unique identification codes corresponding to peers willing to participate in multi-hop peer discovery, comparing the received power of the third peer discovery signal to a predetermined threshold, comparing the received power of the third peer discovery signal to a threshold determined from the received powers of a plurality of peer discovery signals, and combinations thereof.

8. The method of claim 6, further comprising:
    adjusting the hop count when the third peer is selected;
    encoding the hop count with the third peer discovery signal when the third peer is selected; and
    transmitting a third peer discovery signal based on the first unique identification code, the third local identification code and the hop count when the third peer is selected.

9. The method of claim 1, further comprising generating the first peer discovery signal to include the information indicating the first unique identification code of the first peer, the second local identification code of the second peer, and the hop count.

10. An apparatus for supporting multi-hop peer discovery using a first peer having a first unique identification code, the apparatus comprising:
a processor configured to:
decode a second peer discovery signal to obtain a second unique identification code and a second local identification code of a second peer received during a peer-to-peer discovery channel, wherein the second local identification code is locally unique to the second peer and is associated with at least one tone-symbol used to transmit the second unique identification code;
determine whether to select the second peer based on a predetermined criterion; and
transmit a first peer discovery signal from the first peer, the first peer discovery signal including information indicating the first unique identification code of the first peer, the second local identification code of the second peer, and a hop count when the predetermined criterion is satisfied.

11. The apparatus of claim 10, wherein the predetermined criterion is selected from a group consisting of the processor comparing the second unique identification code to a buddy list of unique identification codes, the processor comparing the second unique identification code to a list of unique identification codes corresponding to peers willing to participate in multi-hop peer discovery, the processor comparing the received power of the second peer discovery signal to a predetermined threshold, the processor comparing the received power of the second peer discovery signal to a threshold determined from the received powers of a plurality of peer discovery signals, and combinations thereof.

12. The apparatus of claim 10, wherein the processor is further configured to encode the first peer discovery signal.

13. The apparatus of claim 12, wherein the processor is further configured to decode, at the second peer, the first peer discovery signal including the first unique identification code, the second local identification code and the hop count.

14. The apparatus of claim 13, wherein the processor is further configured to determine whether the decoded bits corresponding to the second local identification code contained in the first peer discovery signal match the second local identification code and whether the decoded bits corresponding to the hop count match a predetermined target hop count.

15. The apparatus of claim 14, wherein the processor is further configured to:
decode a third unique identification code and a third local identification code of a third peer received during a peer-to-peer discovery channel; and
determine whether to select the third peer based on another predetermined criterion if the decoded bits corresponding to the second local identification code contained in the first peer discovery signal match the second local identification code and the decoded bits corresponding to the hop count do not match the predetermined target hop count.

16. The apparatus of claim 15, wherein the other predetermined criterion is selected from a group consisting of the processor comparing the third unique identification code to a buddy list of unique identification codes, the processor comparing the third unique identification code to a list of unique identification codes corresponding to peers willing to participate in multi-hop peer discovery, the processor comparing the received power of the third peer discovery signal to a predetermined threshold, the processor comparing the received power of the third peer discovery signal to a threshold determined from the received powers of a plurality of peer discovery signals, and combinations thereof.

17. The apparatus of claim 15, wherein the processor is further configured to:
adjust the hop count when the third peer is selected;
encode the hop count with the third peer discovery signal when the third peer is selected; and
transmit a third peer discovery signal based on the first unique identification code, the third local identification code and the hop count when the third peer is selected.

18. An apparatus for supporting multi-hop peer discovery using a first peer having a first unique identification code, the apparatus comprising:
means for decoding a second peer discovery signal to obtain a second unique identification code and a second local identification code of a second peer received during a peer-to-peer discovery channel, wherein the second local identification code is locally unique to the second peer and is associated with at least one tone-symbol used to transmit the second unique identification code;
means for determining whether to select the second peer based on a predetermined criterion; and
means for transmitting a first peer discovery signal from the first peer, the first peer discovery signal including information indicating the first unique identification code of the first peer, the second local identification code of the second peer, and a hop count when the predetermined criterion is satisfied.

19. The apparatus of claim 18, wherein the predetermined criterion is selected from a group consisting of comparing the second unique identification code to a buddy list of unique identification codes, comparing the second unique identification code to a list of unique identification codes corresponding to peers willing to participate in multi-hop peer discovery, comparing the received power of the second peer discovery signal to a predetermined threshold, comparing the received power of the second peer discovery signal to a threshold determined from the received powers of a plurality of peer discovery signals, and combinations thereof.

20. The apparatus of claim 18, further comprising means for encoding the first peer discovery signal.

21. The apparatus of claim 20, further comprising means for decoding, at the second peer, the first peer discovery signal including the first unique identification code, the second local identification code and the hop count.

22. The apparatus of claim 21, further comprising means for determining whether the decoded bits corresponding to the second local identification code contained in the first peer discovery signal match the second local identification code and whether the decoded bits corresponding to the hop count match a predetermined target hop count.

23. The apparatus of claim 22, further comprising:
means for decoding a third unique identification code and a third local identification code of a third peer received during a peer-to-peer discovery channel; and
means for determining whether to select the third peer based on another predetermined criterion if the decoded bits corresponding to the second local identification code contained in the first peer discovery signal match the second local identification code and the decoded bits corresponding to the hop count do not match the predetermined target hop count.

24. The apparatus of claim 23, wherein the other predetermined criterion is selected from a group consisting of comparing the third unique identification code to a buddy list of unique identification codes, comparing the third unique identification code to a list of unique identification codes corresponding to peers willing to participate in multi-hop peer discovery, comparing the received power of the third peer discovery signal to a predetermined threshold, comparing the received power of the third peer discovery signal to a threshold determined from the received powers of a plurality of peer discovery signals, and combinations thereof.

25. The apparatus of claim 23, further comprising:
means for adjusting the hop count when the third peer is selected;
means for encoding the hop count with the third peer discovery signal when the third peer is selected; and
means for transmitting a third peer discovery signal based on the first unique identification code, the third local identification code and the hop count when the third peer is selected.

26. A machine readable medium embodying machine executable instructions to implement a method of supporting multi-hop peer discovery using a first peer having a first unique identification code, the machine readable medium being a non-transitory medium, the method comprising:
decoding a second peer discovery signal to obtain a second unique identification code and a second local identification code of a second peer received during a peer-to-peer discovery channel, wherein the second local identification code is locally unique to the second peer and is associated with at least one tone-symbol used to transmit the second unique identification code;
determining whether to select the second peer based on a predetermined criterion; and
transmitting a first peer discovery signal from the first peer, the first peer discovery signal including information indicating the first unique identification code of the first peer, the second local identification code of the second peer, and a hop count when the predetermined criterion is satisfied.

27. The machine readable medium of claim 26, wherein the predetermined criterion is selected from a group consisting of comparing the second unique identification code to a buddy list of unique identification codes, comparing the second unique identification code to a list of unique identification codes corresponding to peers willing to participate in multi-hop peer discovery, comparing the received power of the second peer discovery signal to a predetermined threshold, comparing the received power of the second peer discovery signal to a threshold determined from the received powers of a plurality of peer discovery signals, and combinations thereof.

28. The machine readable medium of claim 26, further comprising instructions for encoding the first peer discovery signal.

29. The machine readable medium of claim 28, further comprising instructions for decoding, at the second peer, the first peer discovery signal including the first unique identification code, the second local identification code and the hop count.

30. The machine readable medium of claim 29, further comprising instructions for determining whether the decoded bits corresponding to the second local identification code contained in the first peer discovery signal match the second local identification code and whether the decoded bits corresponding to the hop count match a predetermined target hop count.

31. The machine readable medium of claim 30, further comprising instructions for:
decoding a third unique identification code and a third local identification code of a third peer received during a peer-to-peer discovery channel; and
determining whether to select the third peer based on another predetermined criterion if the decoded bits corresponding to the second local identification code contained in the first peer discovery signal match the second local identification code and the decoded bits corresponding to the hop count do not match the predetermined target hop count.

32. The machine readable medium of claim 31, wherein the other predetermined criterion is selected from a group consisting of comparing the third unique identification code to a buddy list of unique identification codes, comparing the third unique identification code to a list of unique identification codes corresponding to peers willing to participate in multi-hop peer discovery, comparing the received power of the third peer discovery signal to a predetermined threshold, comparing the received power of the third peer discovery signal to a threshold determined from the received powers of a plurality of peer discovery signals, and combinations thereof.

33. The machine readable medium of claim 31, further comprising instructions for:
adjusting the hop count when the third peer is selected;
encoding the hop count with the third peer discovery signal when the third peer is selected; and
transmitting a third peer discovery signal based on the first unique identification code, the third local identification code and the hop count when the third peer is selected.

* * * * *